(12) United States Patent
Berg

(10) Patent No.: US 6,948,450 B2
(45) Date of Patent: Sep. 27, 2005

(54) SCRAPER FOR ANIMAL STALLS

(75) Inventor: Vernon R. Berg, Marshfield, WI (US)

(73) Assignee: Berg Equipment Corporation, Marshfield, WI (US)

(*) Notice: Subject to any disclaimer, the term of this patent is extended or adjusted under 35 U.S.C. 154(b) by 0 days.

(21) Appl. No.: 10/766,318

(22) Filed: Jan. 28, 2004

(65) Prior Publication Data
US 2004/0261205 A1 Dec. 30, 2004

Related U.S. Application Data
(60) Provisional application No. 60/444,053, filed on Jan. 31, 2003.

(51) Int. Cl.[7] ............................. A01K 1/01; B65G 25/04
(52) U.S. Cl. ........................ 119/451; 198/745; 15/93.1
(58) Field of Search ............................... 119/451, 479; 198/746, 745; 15/93.1

(56) References Cited

U.S. PATENT DOCUMENTS

| | | | |
|---|---|---|---|
| 2,264,939 A | | 12/1941 | Hawkins |
| 2,552,743 A | | 5/1951 | Simpson |
| 2,810,564 A | * | 10/1957 | Zeegers ................... 299/34.07 |
| 3,306,435 A | | 2/1967 | Wenger |
| 3,458,029 A | | 7/1969 | Allen et al. |
| 3,707,141 A | * | 12/1972 | Boer et al. ................. 119/458 |
| 3,768,444 A | * | 10/1973 | Van Huis .................... 119/442 |
| 3,810,444 A | * | 5/1974 | Conley ........................ 119/442 |
| 4,243,137 A | | 1/1981 | Laurenz |
| 4,319,678 A | * | 3/1982 | Hesler ......................... 198/746 |
| 4,320,008 A | | 3/1982 | Kokubo |
| 5,010,620 A | | 4/1991 | Young |
| 5,450,815 A | | 9/1995 | Krehl et al. |
| 5,607,046 A | | 3/1997 | Krehl et al. |
| 5,662,068 A | | 9/1997 | Childs |
| 5,950,565 A | | 9/1999 | Guyot |
| 6,446,298 B1 | | 9/2002 | Berg, Jr. et al. |

FOREIGN PATENT DOCUMENTS

| | | | |
|---|---|---|---|
| DE | 2209309 | | 9/1972 |
| DE | 4444508 C1 | * | 2/1996 ............ A01K/1/01 |
| GB | 2019352 A | * | 10/1979 ............ B66D/1/08 |
| SU | 976911 | | 12/1982 |

OTHER PUBLICATIONS

Norbo, Barn Equipment for the Commercial Dairyman, Magnum 4400 Alley Scraper.
Patz, Alley Scrapers, Nov. 2001.
Waste Handlers by J–STAR, Cable Alley Scrapers.

* cited by examiner

Primary Examiner—Michael J. Carone
Assistant Examiner—Bret Hayes
(74) Attorney, Agent, or Firm—Ryan Kromholz & Manion, S.C.

(57) ABSTRACT

A scraper for removing debris from the floor of an animal stall is provided with a first motorized drum, a second motorized drum, a cable extending between the first and second drums, a scraper and a switch tripper carried by the cable. The switch tripper actuates a switch in communication with the first motorized drum to stop and reverse direction of the scraper and cable.

11 Claims, 4 Drawing Sheets

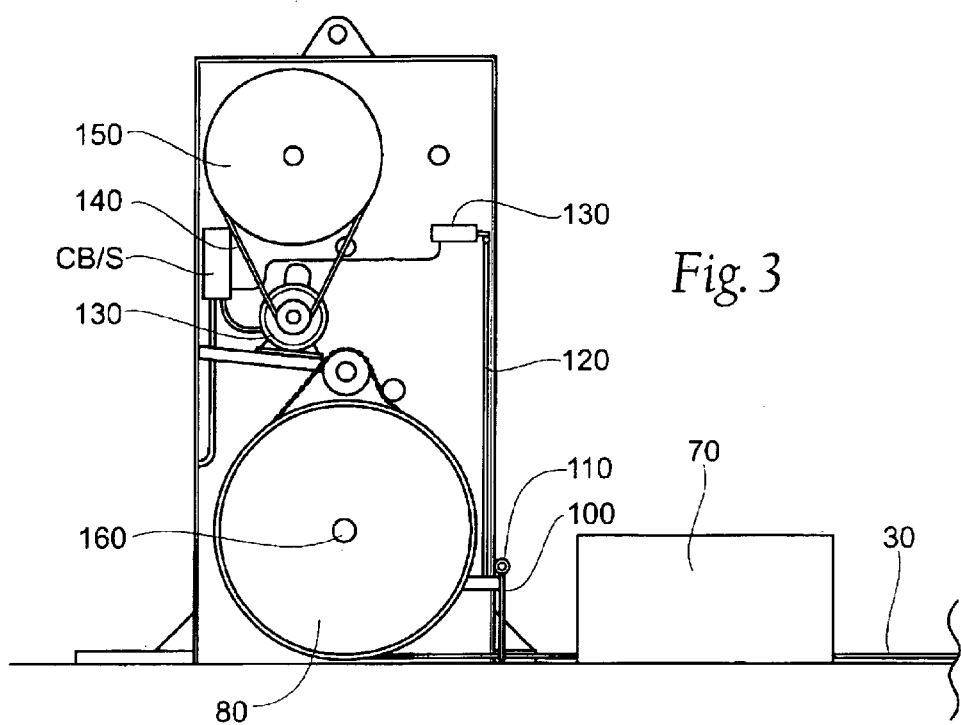
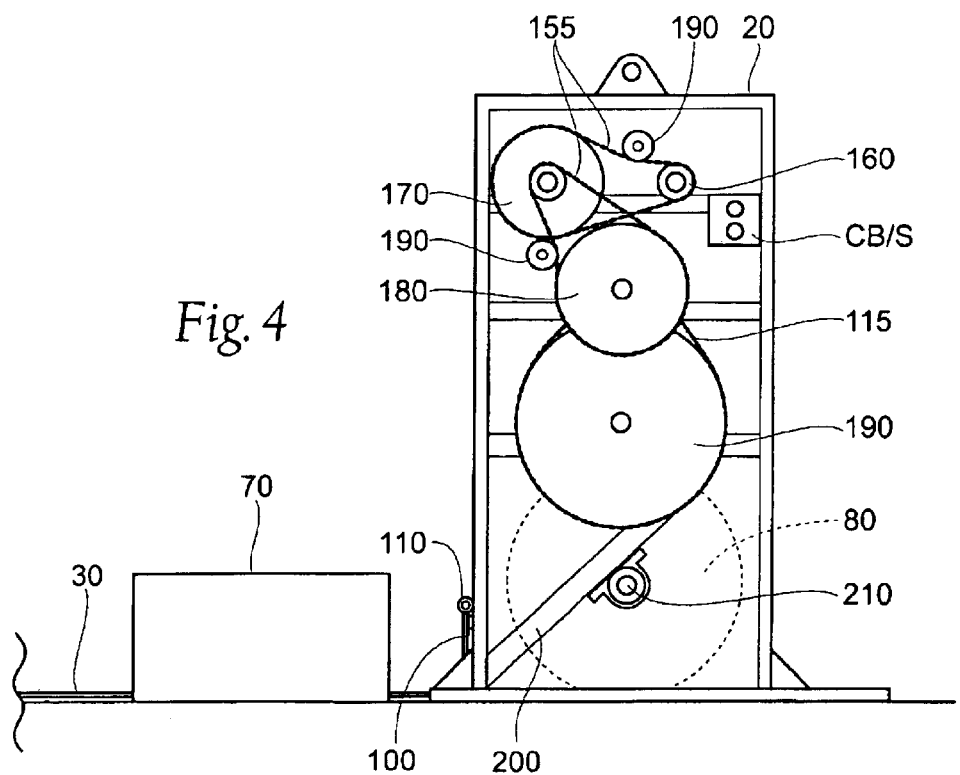

SCRAPER FOR ANIMAL STALLS

RELATED APPLICATION

This application claims the benefit of co-pending provisional Application Ser. No. 60/444,053, filed 31 Jan. 2003.

This invention relates to equipment for animal husbandry. More specifically the invention relates to a scraper device particularly suited for clean up of cattle confinement areas such as barns, free stalls and pits.

BACKGROUND OF THE INVENTION

Various scraper devices have heretofore been utilized for the clean up of cattle stalls and barns. Typically such devices employ some type of scraper blade. With conventional blades, however, clean up efficiency is reduced by the fact that if a straight blade encounters an irregularity in the floor surface, a one piece blade is caused to rise up and thus leave areas which are not scraped clean.

One type of scraper assembly is shown in U.S. Pat. No. 4,243,137 wherein a pair of scraper blades are hingedly connected to a frame. However, to allow the blades to move vertically the device of that patent requires that the blades be formed of several components which are loosely bolted together, thus reducing the ability to maintain downwardly directed scraping forces.

A need has existed for improved scraper devices for use in cleaning up of animal manure from floor surfaces that enable improved cleanup of floor surfaces that are characterized by various surface irregularities.

SUMMARY OF THE INVENTION

The present invention relates to an improved scraper mechanism particularly useful in cleaning up of stalls such as free stalls wherein animals are free to roam within the stall structure.

Alley scrapers of the present invention keep barn alleys clean. Clean alleys contribute to better animal health with fewer foot problems and a better overall barn environment. Clean alleys also provide safer conditions for both animals and workers with better footing. Clean alleys mean less animal stress, fewer muscle strains, and fewer fall downs. Healthy, less stressed animals give better milk production. Alley scrapers are easy to install in new barns or retrofitted to existing barns, with or without guide grooves in the floor. Pre-wired terminal boxes and unitized construction make installation of the present invention in barns quite simple.

A device for cleaning animal waste from stalls is disclosed, the device having a first motorized drum; a second motorized drum; a cable extending between said first and said second motorized drums; a scraper carried by said cable; a switch tripper carried by said cable; a switch in communication with said first motorized drum; said switch responsive to said switch tripper to perform at least one of the following: moving the cable in a first direction, moving the cable in a second direction, and stopping movement of said cable.

In preferred embodiments, the switch is carried by a housing, which also carries an override stop between the switch and the first drum.

A method of operating an alley scraper is also disclosed, wherein a time-independent switch is operable to slide said alley scraper a predetermined distance.

Longer alleys can be cleaned by adding more scraper blades.

BRIEF DESCRIPTION OF THE DRAWINGS

FIG. 3 is a side view of an embodiment of a drum housing;

FIG. 4 is a side view (from another side) of an embodiment of a drum housing;

DETAILED DESCRIPTION OF THE INVENTION

Figure 1:
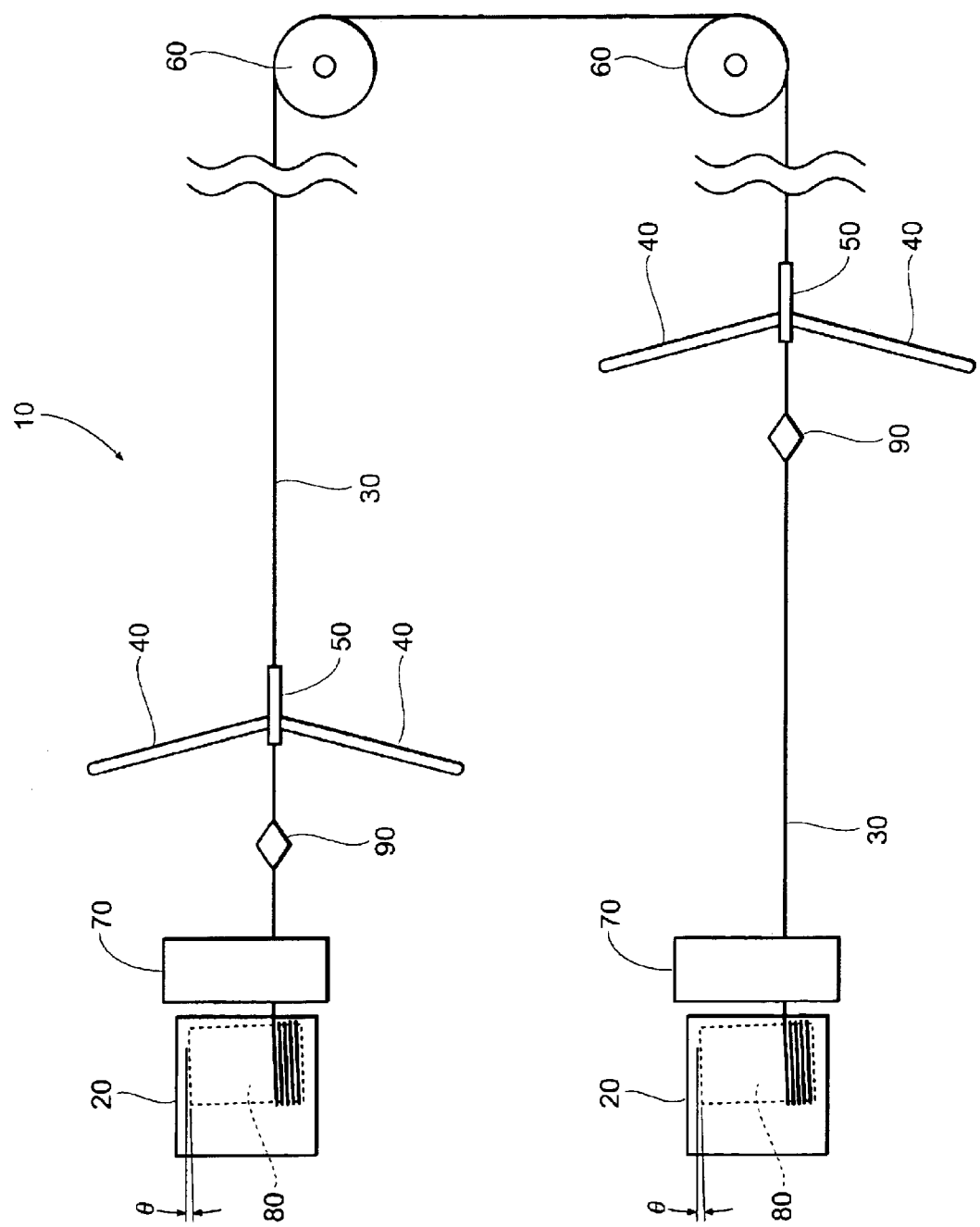
FIG. 1 is a top view of one embodiment of a scraper device of this invention.

Referring to FIG. 1, there is seen a scraper assembly 10 of the present invention. Assembly 10 comprises first and second drum houses 20, a wire 30, a scraper 40, a draw bar 50, and wheels 60 if the user desires a multiple alley configuration.

The wire 30 runs between the two drum houses 20, around two wheels 60 in the displayed configuration, although more or less wheels 60 may be used in accordance with a desired configuration.

When one of the drums 80 within one of the drum housings 20 is operated in a forward direction (pulling cable) the second drum is allowed to operate in a reverse direction (feeding out cable) by disengaging a motor driving the reverse direction drum. Because of the gearing described later, the dead motor and drum will provide a sufficient drag on the scraper assembly 10 such that the cable 30 will be kept desirably taught.

In the preferred embodiment, two switch trippers 90 are provided closest in proximity to limit switch housings 70 relative to any scraper 40 in the direction of cable travel. As will be described later, the switch trippers 90 serve to trip switches in communication with the motorized drums 80, to first move the cable 30 (and all scrapers attached to the cable 30) in a first direction toward one of the drums 80, next to stop the cable 30 and scrapers once the switch trippers 90 reach a portion of a limit switch housing 70, and next to reverse direction of the cable 30, so that the cable 30 is moving away from the first drum 80 and being drawn into the second drum 80.

This embodiment also allows for less than half of the entire cable length to be placed on a single drum 80, whereas the prior art mainly required a single drum has to be large enough to hold all of the cable at once.

In a preferred embodiment, an axis of the drum 80 (or the entire housing 20 carrying the drum) is canted at a slight angle Ø from perpendicular between the direction of the cable 30 and the axis of the drum 80, such that winding the cable 30 onto the drum 80 is promoted in an orderly winding fashion. This angle Ø thus allows (but does not require) the user to forego use of a cable winder as is present in the prior art, as rotating of drum 80 winds cable 30 onto the drum promoted along the axis of the drum 80.

Figure 2:
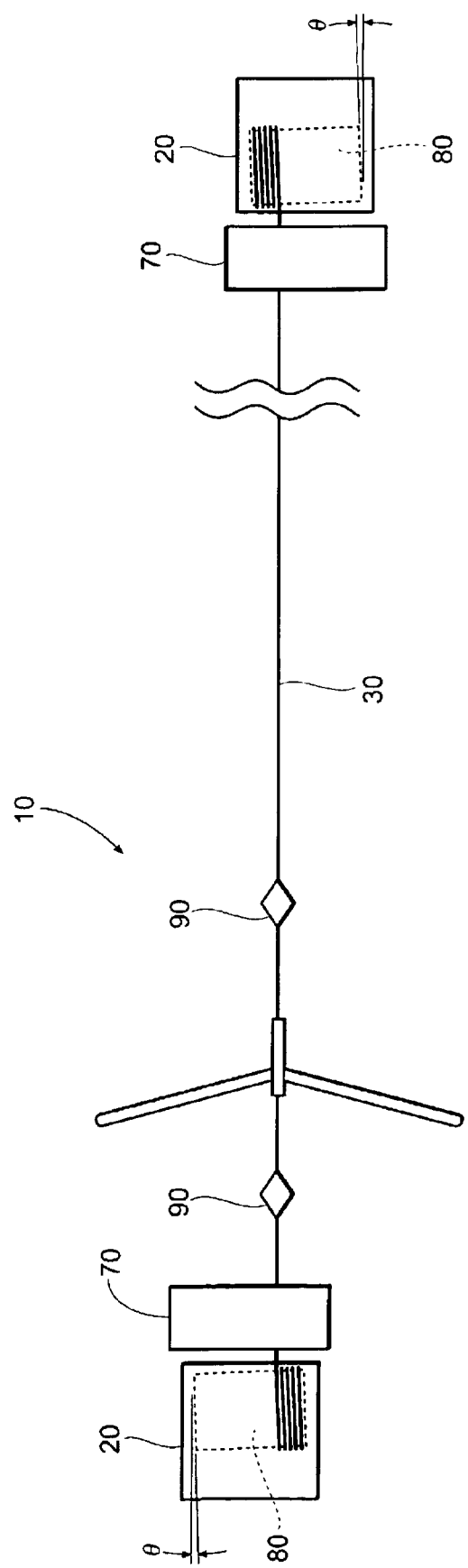
FIG. 2 is a top view of an alternate embodiment of the present invention.

Referring now to FIG. 2, a top view of an alternate embodiment of the present invention is shown. In this embodiment, the scraper assembly 10 is equipped without wheels 60, for a single alley configuration.

Referring now to FIG. 3, a side view of the drum housing 20 and the limit switch housing 70 is shown.

In commercial embodiments, an efficient drive unit comprises an electric motor 130 through a ratio heavy duty gear box, comprising driving belt 140, in turn driving wheel 150, in turn driving (next components displayed on FIG. 4) high speed sprocket 160, in turn driving a chain 155, in turn driving a larger, slower sprocket 170, in turn driving a chain 155, in turn driving a larger, slower sprocket 180, in turn driving a chain 155, in turn driving a larger, slower sprocket 190, until finally a chain 155 (remaining components shown in FIG. 3 again) drives drum 80 at a rate reduced from the turning speed of the motor 130. In a preferred embodiment, an approximately 1750 to 1 reduction is provided, meaning one revolution per minute of the drum 80 for every 1750 revolutions per minute from the motor 130. Also preferred, wheels 190 mounted on a pivot with springs keep slack out of the roller chains 155.

In a preferred embodiment, this arrangement transfers power to the drive drum 80 via #60 roller chain for a safe scraper speed of preferably 6 feet per minute, although preferred speed may be application specific. The drive unit also preferably features easily accessible, greaseable 1½" ball bearings 210, carried by cross bar 200, to support the drive drum 80. The thrust of the bearing 210 is taken by the cross bar 200 a preferable 45° angle so there is no pull on it.

In commercial embodiments, the cable capacity of the drum will approximate 360 feet of ⅜" cable, as one scraper blade stroke has been found to efficiently clean 300 feet of alley, although again preferences may be application specific. Of course, larger or smaller mechanical components could be used and this is also application specific.

For control of the unit 10, several control boxes/switches are designated throughout the drawings at CB/S, where typically controls such as stop, go, reverse and forward can be advantageously provided to manually control the unit 10.

Figure 5:
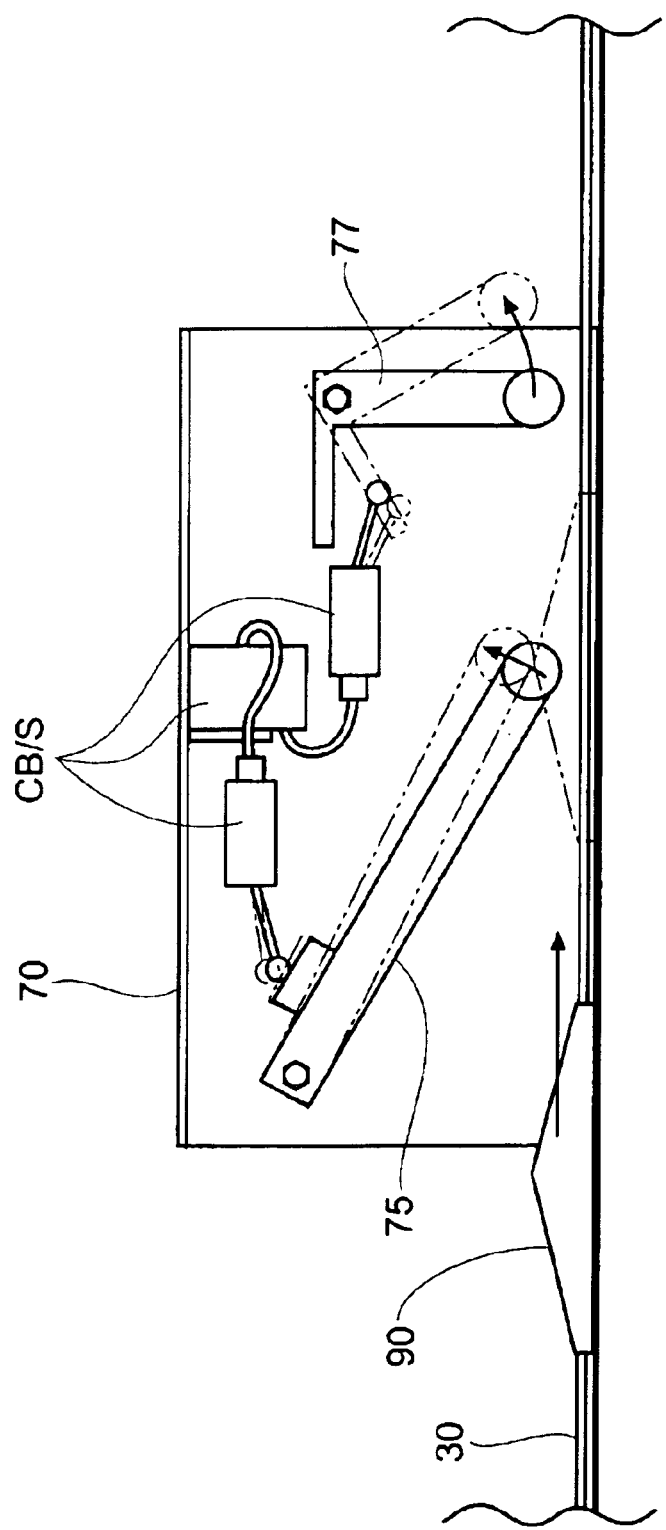
FIG. 5 is a side view of an embodiment of a limit switch housing.

Referring now to FIG. 5 a side view of an embodiment of a limit switch housing 70 is shown. As can be seen, when the switch tripper 90 approaches the housing 70 along cable 30, the switch tripper 90 will engage limit switch operating arm 75 sending a control to CB/S by actuation of switch 72. It is preferred that switch 72 stop cable 30 upon actuation and then reverse direction of switch tripper 90 (and the scrapers behind it).

When two switch trippers 90 are used in conjunction with two housings 70 and two limit switch operating arms 75, such as shown in FIGS. 1 or 2, it will be understood that the scrapers will can run in a continuous mode continuously reversing direction of travel toward and away from one of the drum housings 20 to automate alley scraping.

Alternatively, the system can be equipped with sufficient controls at one of the CB/S to operate in a single-cycle mode, wherein the switch tripper 90 will travel through a single cycle from its start position, through a reversal, and then return to its start position, providing a single alley sweep. In this respect, the present invention differs from the prior art in that the prior art primarily operated continuously, or through a time-dependent setting such as 15 minute run time. The single cycle mode is thus considered time-independent.

Still referring to FIG. 5, a fail-safe is provided at fail-safe arm 77 actuating fail-safe switch 76, which is intended to be a system shutoff. Referring now to FIGS. 3 and 4, in conjunction with FIG. 5, if fail-safe arm 77 should fail to actuate fail-safe switch 76 and shut the system down, a secondary failsafe door 100 is provided that is pivotally coupled to the housing 20, and communicatively coupled with secondary fail-safe rod 120, intended to shut down the system through secondary fail-safe switch 130.

In an alternative embodiment (not shown), a speed change switch may be provided so that at start-up of the system, if slack is present such as if the scraper is on frozen manure, the speed change switch can account for the slack or speed change from start winding to run winding. With a single phase motor provided, cable 30 may be impreferably tight enough that when switch tripper 90 gets to limit switch housing 70, cable 30 could relax and turn one of the motors 130 backwards. A centrifugal on a shaft carrying one of the sprockets may be provided. Alternatively, an overrunning clutch could be provided on the motors 130.

The configurations described above may be modified by inclusion of any number of drum houses or wheels, to fit the application or as a user desires. In this manner, one or more drum houses 20 may be used in conjunction with zero, one or more wheels 60 to configure a scraper system.

Further modifications and variations of the invention will be apparent to those skilled in the art. Thus, the invention should be considered limited only by the scope of the following claims and including equivalents thereof.

I claim:

1. A device for cleaning animal waste from stalls comprising:
   a first independent motorized drum coupled to a first motor, said motor operable in a first direction;
   a second independent motorized drum coupled to a second motor, said motor operable in a second direction;
   a cable extending between said first and said second motorized drums;
   a scraper carried by said cable;
   a first switch tripper carried by said cable, said first switch tripper positioned between said first motor and said scraper;
   a second switch ripper carried by said cable, said second switch tripper positioned between said second motor and said scraper;
   a first switch in communication with said first motor;
   a second switch in communication with said second motor;
   said first switch responsive to said switch first tripper;
   said second switch responsive to said second switch tripper;
   wherein when said first motor is operating in said first direction, said second motor provides sufficient drag to keep the cable desirably taught.

2. The device of claim 1, wherein said switch is coupled to a housing.

3. The device of claim 1, the device further comprising an override stop, said override stop between said first switch and said first drum.

4. The device of claim 1, the device further comprising an override stop, said override stop between said second switch and said second drum.

5. The device of claim 1, the device further comprising a wheel for orienting said cable from a first direction to a second direction.

6. The device of claim 1, the device further comprising a first drum housing coupled to said first motorized drum, and a second drum housing coupled to said second motorized drum.

7. The device of claim 6 wherein said first drum housing is canted from a direction of cable travel at an angle such that rotating of said first drum promotes winding of said cable onto the drum along an axis of the drum in successive rows.

8. The device of claim 6 wherein said first and said second motorized drums are coupled to said first and said second drum housings by a bearing.

9. The device of claim 1, the device further comprising a forward switch in communication with said first motorized drum, a reverse switch in communication with said first motorized drum, a stop switch in communication with said first motorized drum, and a go switch in communication with said first motorized drum.

10. The device of claim 1, the device further comprising a forward switch in communication with said second motorized drum, a reverse switch in communication with said second motorized drum, a stop switch in communication with said second motorized drum, and a go switch in communication with said second motorized drum.

11. The device of claim 1 wherein said first and said second motorized drums are coupled with a motor by a roller chain drive.

* * * * *